Figure 1:
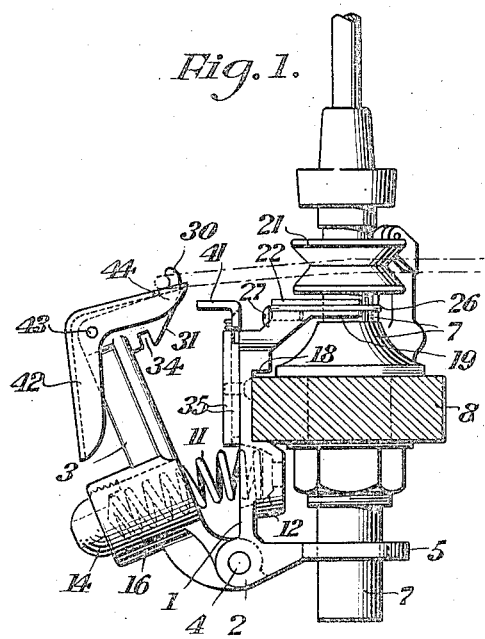

Apr. 17, 1923.

M. CURRY ET AL 1,451,685

BAND TYING GAUGE

Filed Apr. 5, 1921

2 sheets-sheet 1

Inventors
Malcolm Curry &
Albert Cook

By their attorneys

Apr. 17, 1923.   
M. CURRY ET AL  
1,451,685  
BAND TYING GAUGE  
Filed Apr. 5, 1921   2 sheets-sheet 2
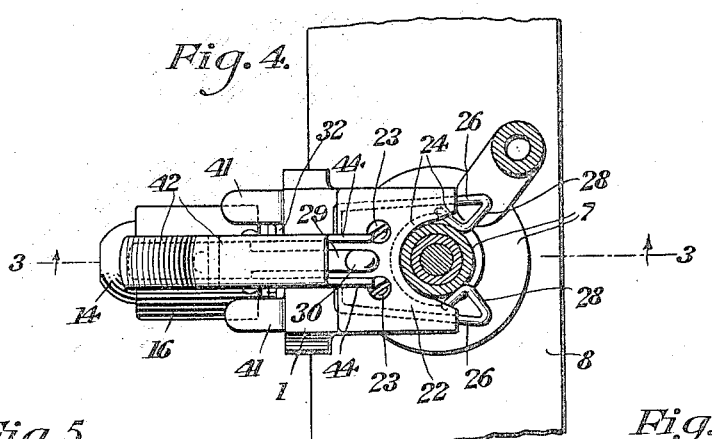
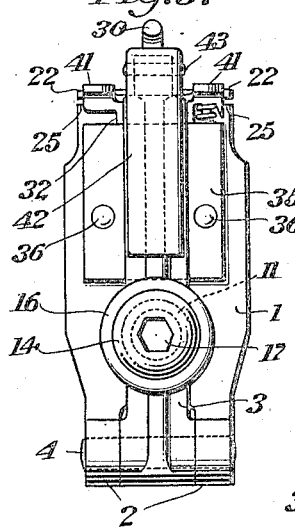
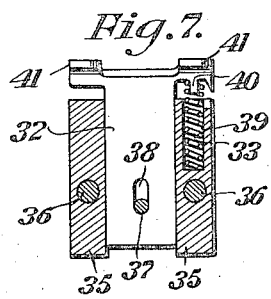
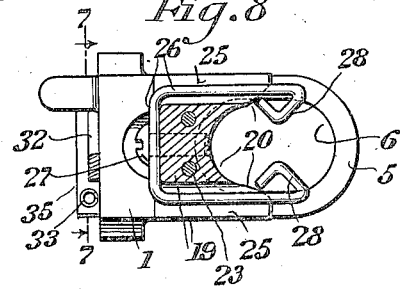
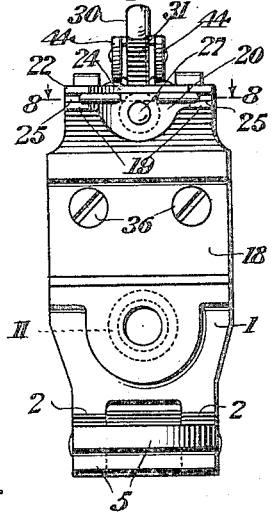
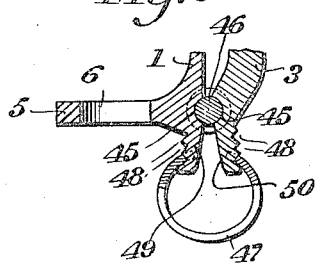
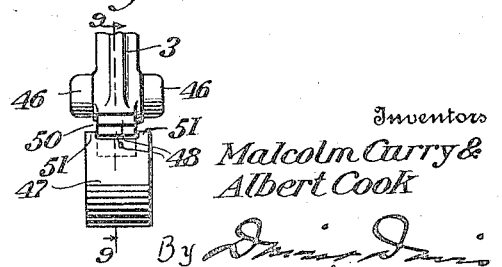
Inventors
Malcolm Curry &
Albert Cook
their attorneys.

Patented Apr. 17, 1923.

1,451,685

UNITED STATES PATENT OFFICE.

MALCOLM CURRY, OF SCARSDALE, NEW YORK, AND ALBERT COOK, OF HOLYOKE, MASSACHUSETTS; SAID CURRY ASSIGNOR TO SAID COOK.

BAND-TYING GAUGE.

Application filed April 5, 1921. Serial No. 458,862.

*To all whom it may concern:*

Be it known that we, MALCOLM CURRY, a citizen of the United States, and resident of Scarsdale, in the county of Westchester and State of New York, and ALBERT COOK, a citizen of the United States, and resident of Holyoke, in the county of Hampden and State of Massachusetts, have invented certain new and useful Improvements in Band-Tying Gauges, of which the following is a specification.

This invention relates to improvements in gauges for use in tying driving bands of band-driven machines with a regulated tension, the improved device being especially adapted for use in tying the spindle driving bands of spinning or twisting frames.

The invention has for its object to provide a simple and durable device of the character set forth so constructed as to decrease the labor and time required in tying bands.

Figure 2:
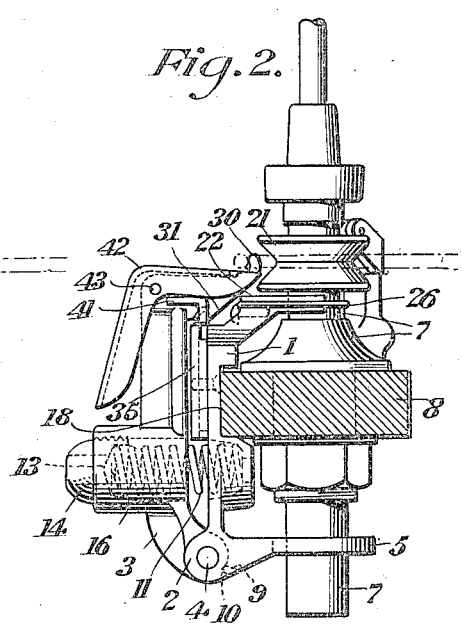
Figure 3:
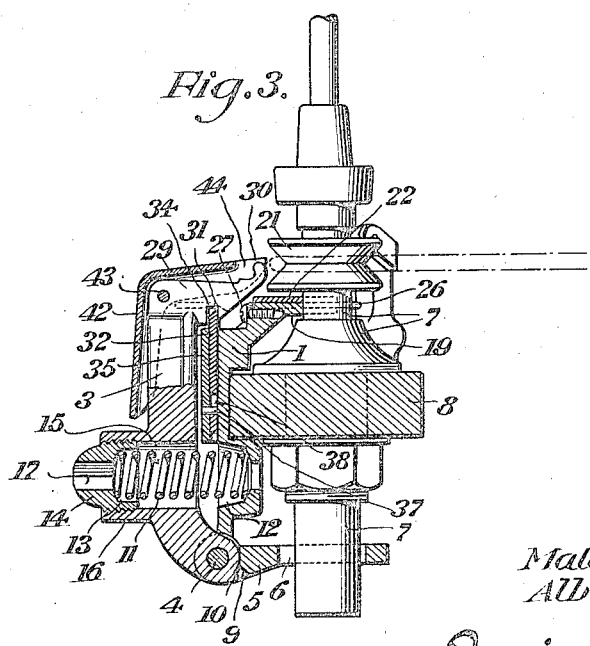

In the drawings:

Figure 1 is a side elevation of the device attached to a spindle and spindle rail ready for use;

Fig. 2 a similar view showing the pivoted tension controlling member in locked position;

Fig. 3 a vertical sectional view of the device on the line 3—3 of Fig. 4, the band throw-off lever being shown tripped;

Fig. 4 a plan view of the device, the parts being in the position shown in Fig. 2;

Figs. 5 and 6 end elevations respectively of the outer and inner faces of the device;

Fig. 7 a detail sectional view on the line 7—7 of Fig. 8;

Fig. 8 a fragmentary sectional view on the line 8—8 of Fig. 6;

Fig. 9 a section on the line 9—9 of Fig. 10; and

Fig. 10 a fragmentary side elevation showing a modified form of pivotal connection and tension regulating spring.

The device comprises an attachment and positioning member 1 bifurcated at its lower end to form a yoke 2 in which the lower end of a swinging tension-regulating member 3 is pivotally held by a suitable pivot pin 4. A horizontal bracket 5 is formed integrally with yoke 2 at the opposite side of member 1 from that at which member 3 is located, said bracket being provided with an elongated aperture 6 adapted to receive the lower end of the spindle bearing or bolster 7 which depends below the rail 8 of the spinning frame. Aperture 6 is preferably of the same width transversely of bracket 5 as the diameter of the lower part of the spindle bearing and is rounded at its ends to correspond with the curvature of the cylindrical bearing.

Bracket 5 is provided at one end with an abutment or shoulder 9 adapted to be engaged by an abutment or shoulder 10 on the lower end of member 3 to limit the extent of movement of the free upper end of member 2 away from member 1. Member 3 is normally swung away from member 1, to the limit of movement permitted by the knuckle joint connection between the members, by a helical tension-regulating spring 11. One end of spring 11 is confined in a socket 12 in member 1 and the other end thereof is confined in a socket 13 formed in an externally threaded plug or nut 14 screwed into the outer end of a cylindrical bore or passage 15 extending through member 3. Member 3 is formed with a cylindrical enlarged portion 16 intermediate its ends provided with the bore 15. Nut 14 is provided with a socket 17, preferably of hexagonal or other form requiring a special wrench or tool for adjusting the nut to vary the tension of spring 11.

Member 1 is provided intermediate its ends with a transversely extending channel or recess 18 adapted to receive the outer edge of the rail 8 of the spinning frame, and is provided at its upper end with an integral bracket 19 located over bracket 5. The bottom wall of channel 18 is preferably beveled along its outer edge to facilitate the engagement of member 1 with the rail. Bracket 19 is cut away at its outer end to form a notch or recess 20 adapted to receive the spindle bearing 7 at a point between rail 8 and the spindle whorl 21. A plate 22 is detachably held to the upper face of bracket 19 by screws 23, the outer end of the plate being cut-away to form a notch or recess 24 of the same size and shape as the recess 20 in the bracket. The inner ends of recesses 20 and 24 are preferably curved on the same arc as the surface of the spindle bearing 7 and the sides of the recess adjacent the mouth thereof are preferably flared outwardly as shown to facilitate the entrance of the spindle bearing into said recesses. The upper face of bracket 19 is cut away along opposite sides thereof as shown at 25 to form channels under plate 22 in which are confined the side arms of a U-shaped spring 26, the transverse part of which is clamped against a shoulder at the inner end of bracket 19 by the head of a screw 27 threaded into the bracket.

The free ends of the side arms of spring 26 are bent inwardly toward each other and then outwardly to form two triangular end portions 28 between which the spindle bearing may readily pass in either direction and which serve to grip the bearing and frictionally hold member 1 thereto. Spring 26, recesses 20 and 24, and elongated opening 6 in bracket 5 serve to align the device with the spindle, and detachably but firmly holding the device in engagement with the spindle and rail. The engagement or rail 8 in channel 18 serves to position the device at the proper point longitudinally of the spindle and also to prevent swinging of the device around the spindle bearing.

Member 3 is provided at its upper end with an inwardly extending arm 29 provided at its inner end with an upwardly extending hook or projection 30 around which the spindle driving band is passed in tying the band, as indicated in dotted lines in Figs. 1 and 2. The inner end of arm 29 is beveled downwardly and outwardly to form a cam surface 31 adapted to ride over the upper end of a vertically slidable latch 32 and depress said latch against the pressure of a spring 33 when member 3 is swung toward member 1. Arm 29 is provided with a notch 34 into which the upper end of latch bar 32 is adapted to snap to lock member 1 against movement in either direction after the same is swung a predetermined distance toward the spindle.

Latch 32 is confined in a channel formed in the inner face of a block 35 which is held against the inner face of member 1 by two screws 36. A pin 37, held to block 35 and engaging in a slot 38 in latch bar 32, serves to limit the sliding movement of the latch bar. Spring 33 is partly housed in a vertical bore 39 in block 35 and the upper end of the spring surrounds a depending lug 40 formed on one of a pair of finger pieces 41 with which the upper end of the latch is provided An angular sheet metal band cast-off lever 42 is pivotally held by a pin 43 to the upper end of member 3. The lever 42 is of channel form in cross-section, one arm thereof being adapted to embrace arms 29 of member 3 and the other arm thereof being adapted to embrace the upper portion of member 3. The transverse web of the horizontal arm of lever 42 is cut away at the free end of said arm and the vertical side webs of said cut away portion of the lever arm extend along opposite sides of hook 30, as shown at 44, so as to lift the tied band off said hook when the depending arm of the lever is swung inwardly toward member 3.

The operation of tying a band is as follows:

The lower end of spindle bearing 7 is engaged in aperture 6 in bracket 5, and member 1 is then swung toward the spindle to engage the outer edge of rail 8 in channel 18 and cause the upper end of bearing 7 to be clamped in registering recesses 20 and 24 in bracket 19 and plate 22 by the U-shaped spring 26. The spindle driving band is then passed around the driving pulley or cylinder and its ends brought around hook 30 over the end portions 44 of the cast-off lever 42, as indicated in Fig. 1. The knot is then partly formed and pull exerted to contact the loop thus formed by the band. The pull of the looped band swings member 3 towards member 1 as the loop is contracted until latch 32 snaps in notch 34 in member 1. The band is then at the desired tension and, as member 3 is locked against return movement, the ends of the band may be completely knotted together without danger of increasing or relieving the tension and without effort on the part of the operative to hold member 3 against the pressure of spring 11. When the knot is completed and the loose ends of the band clipped off, the operative presses the depending arm of lever 42 toward member 3, whereupon the end portions 44 of said lever swing upwardly and lift the band off hook 30 to permit the band to snap into the groove in the spindle whorl 21. Latch 32 is then disengaged from notch 34 by pressing downward on one of the finger pieces 41, to permit member 3 to swing outwardly to its normal position, and member 1 is then disengaged from the spindle bearing. We have found in practice that the "kick" of spring 11, when latch 32 is released, is sufficient to automatically disengage the device from the spindle, so that the operative may simply depress the latch and let the device drop into his hand.

In Figs. 9 and 10 a modified form of pivotal connection between members 1 and 3 is shown, and also a modified form of spring and means for varying the tension of the spring. In this construction, members 1 and 3 are provided adjacent their lower ends with transverse grooves 45 in which the shank of a pivot bolt 46 engages, the members being clamped against opposite sides of the bolt by the tension regulating spring 47 so as to have a limited rocking movement about the bolt as a pivot. Spring 47 comprising a split ring of resilient metal the ends of which are adapted to be engaged in notches 48 formed in the outer sides of arms or extensions 49 and 50 of members 1 and 3 which depend below pivot bolt 46. Each arm 49 and 50 is provided with a plurality of notches so that the ends of spring 47 may be engaged with the arms different distances from the pivot bolt to vary the pressure required to move member 3 from the position shown in Fig. 1 to the locked position shown in Figs. 2 and 9. The arms 49 and 50 are adapted to abut against each other to limit the outward swinging movement of member 3. The ends of spring 47 are notched to provide fingers 51 which engage the edges of arms 49 and 50 and prevent sidewise movement of spring 47.

What we claim is:

1. A device of the class set forth comprising an attachment member, a band engaging member pivotally held to the attachment member and arranged to swing toward said member, and a band-tension controlling spring for normally swinging the band engaging member away from the attachment member, whereby the tension placed on the band will swing the band engaging member and compress the tension controlling spring.

2. A device of the class set forth comprising an attachment member provided with means for engaging a spindle support, a band-engaging member pivotally held to the attachment member and arranged to swing toward the spindle support, means for limiting the extent of pivotal movement of the band-engaging member away from the spindle support, and a band-tension controlling spring for normally swinging the band-engaging member away from the spindle support, whereby the tension placed on the band will swing the band engaging member and compress the tension controlling spring.

3. A device of the class set forth comprising an attachment member, means on said member for holding the same to spindle-supporting means, a band-engaging member pivotally held to the attachment member and arranged to swing toward the spindle support, means for limiting the extent of pivotal movement of the band-engaging member away from the spindle support, a band-tension controlling spring for normally swinging the band-engaging member away from the spindle support, and means for varying the tension of the spring.

4. A device of the class set forth comprising a supporting member, means carried by the supporting member for detachably clamping the same to a spindle support, a swinging member pivotally held to the supporting member and provided with band engaging means, a spring connected with the swinging member and supporting member for resisting movement of the swinging member by a band, and band cast-off means mounted on the swinging member.

5. A device of the class set forth comprising a supporting member, means carried by the supporting member for detachably clamping the same to a spindle support, a swinging member pivotally held to the supporting member and provided with band engaging means, a spring connected with the swinging member and supporting member for resisting movement of the swinging member by a band, means for automatically locking the swinging member against movement after a predetermined tension has been placed on a band, and means carried by the swinging member for casting a tied band off the band-engaging means.

6. A device of the class set forth comprising a supporting member, means carried by the supporting member for detachably clamping the same to a spindle support, a swinging member pivotally held to the supporting member adjacent one end and provided with band engaging means, a spring connected with the swinging member and supporting member for resisting movement of the swinging member by a band, a spring-pressed latch held to the supporting member, a cam on the swinging member adapted to ride over said latch when said member is pulled toward the supporting member in contracting a band, said cam having a notch at its outer end in which the latch is adapted to engage, and a finger piece on said latch.

7. A device of the class set forth comprising a supporting member, means carried by the supporting member for detachably clamping the same to a spindle support, a swinging member pivotally held to the supporting member adjacent one end and provided with band engaging means, a spring connected with the swinging member and supporting member for resisting movement of the swinging member by a band, a spring-pressed latch held to the supporting member, a cam on the swinging member adapted to ride over said latch when said member is pulled toward the support in contracting a band, said cam having a notch in which the latch is adapted to engage, a finger piece carried by the latch, and manually operable means pivotally held to the swinging member for releasing a tied band from the band engaging means.

8. A device of the class set forth comprising a supporting member having vertically spaced brackets one of which is provided with an opening adapted to receive a spindle bearing and the other of which is provided with resilient means for detachably clamping the same against a spindle bearing, a member shiftably held to the supporting member and provided with band engaging means, and a spring for resisting movement of said member by a band.

9. A device of the class set forth comprising a supporting member having vertically spaced brackets one of which is provided with an opening adapted to receive a spindle bearing and the other of which is provided with resilient means for detachably clamping the same against a spindle bearing, a band-engaging member shiftably held to the supporting member, a tension regulating spring for resisting movement of the band-engaging member by a band, and means for locking said band-engaging member after a predetermined movement thereof in opposition to said spring.

10. A device of the class set forth comprising a supporting member, means carried by the supporting member for detachably interlocking the supporting member with a spindle bearing at two vertically spaced points, means on said supporting member adapted to embrace a spindle supporting rail at a point intermediate the points of connection of the supporting member with the spindle bearing, a band-engaging member pivotally held to the supporting member, and a tension controlling spring for resisting movement of said band-engaging member by a band.

11. A device of the class set forth comprising a supporting member, means carried by the supporting member for detachably interlocking the supporting member with a spindle bearing at two vertically spaced points, said supporting member being provided with means adapted to receive a spindle supporting rail at a point intermediate the points of connection of the supporting member with the spindle bearing, a band engaging member pivotally held to the supporting member, a spring resisting movement of said band-engaging member by a band, and means for varying the tension of the spring.

12. A device of the class set forth comprising a supporting member, means carried by the supporting member for detachably interlocking the supporting member with a spindle bearing at two vertically spaced points, said supporting member being provided with a transverse recess adapted to receive a spindle supporting rail at a point intermediate the points of connection of the supporting member with the spindle bearing, a band engaging member pivotally held to the supporting member, a spring resisting movement of said band-engaging member by a band, and means carried by said band-engaging member for casting off a tied band.

13. A device of the class set forth comprising a supporting member, means carried by the supporting member for detachably interlocking the support with a spindle bearing at two vertically spaced points, said supporting member being provided with a transverse recess adapted to receive a spindle supporting rail at a point intermediate the points of connection of the supporting member with the spindle bearing, a band engaging member pivotally held to the supporting member, a spring resisting movement of said band-engaging member by a band, and a latch mounted on the supporting member for automatically locking the band-engaging member after a predetermined movement thereof in opposition to said spring.

14. A device of the class set forth comprising a supporting member, means carried by the supporting member for detachably interlocking the support with a spindle bearing at two vertically spaced points, said supporting member being provided with a transverse recess adapted to receive a spindle supporting rail at a point intermediate the points of connection of the supporting member with the spindle bearing, a band-engaging member pivotally held to the supporting member, a spring resisting movement of said band-engaging member by a band, a latch mounted on the supporting member for automatically locking the band-engaging member after a predetermined movement thereof in opposition to said spring, means for varying the tension of the spring, and means for disengaging a tied band from said band-engaging member.

15. A device of the class set forth comprising a supporting member having a rail receiving channel in one face thereof, a bracket on said supporting member below the channel having an elongated aperture therein adapted to receive the lower end of a spindle bearing, resilient means carried by the supporting member above said channel for frictionally gripping a spindle bearing, a band-engaging member pivotally held to the supporting member adjacent its lower end, and a spring for normally swinging the free end of said member away from the supporting member.

16. A device of the class set forth comprising a supporting member provided with rail-embracing means, a bracket on said supporting member having an opening therein adapted to receive the lower end of a spindle bearing, resilient means carried by the supporting member for frictionally gripping a spindle bearing above the spindle rail, a band-engaging member pivotally held to the supporting member, a spring for resisting movement of said member by a band, means for limiting the extent of movement of the band-engaging member by the spring, and means for locking the band-engaging member to the supporting member after a predetermined movement thereof in opposition to said spring.

17. A device of the class set forth, comprising an attachment member, a band-engaging member pivotally held to the attachment member, a spring for resisting movement of the band-engaging member by a band, a latch mounted on the attachment member, and a cam on the band-engaging member adapted to ride over said latch and provided with a notch in which said latch is adapted to snap to automatically lock the band-engaging member after a predetermined movement thereof by a band.

18. A device of the class set forth, comprising an attachment member, a band-engaging member pivotally held to the attachment member, a spring for resisting movement of the band-engaging member by a band, a latch mounted on the attachment member, a cam on the band-engaging member adapted to ride over said latch and provided with a notch in which said latch is adapted to snap to automatically lock the band-engaging member after a predetermined movement thereof by a band, and a band cast-off device shiftably mounted on the band-engaging member.

19. A device of the class set forth comprising a supporting member, a swinging member pivotally held to the supporting member and provided with band engaging means and arranged to swing toward the supporting member, a spring connected with the swinging member for resisting movement of the swinging member by a band, and means for automatically locking the swinging member against movement after a predetermined tension has been placed on a band.

In testimony whereof we hereunto affix our signatures.

MALCOLM CURRY.
ALBERT COOK.